(12) United States Patent
Sheridan (10) Patent No.: US 10,066,506 B2
(45) Date of Patent: Sep. 4, 2018

(54) REDUCED MISALIGNMENT GEAR SYSTEM

(71) Applicant: United Technologies Corporation, Farmington, CT (US)

(72) Inventor: William G. Sheridan, Southington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 12 days.

(21) Appl. No.: 15/685,491

(22) Filed: Aug. 24, 2017

(65) Prior Publication Data

US 2017/0350276 A1 Dec. 7, 2017

Related U.S. Application Data

(63) Continuation of application No. 14/912,535, filed as application No. PCT/US2014/050873 on Aug. 13, 2014, now Pat. No. 9,745,862.
(Continued)

(51) Int. Cl.
*F01D 25/18* (2006.01)
*F16H 1/28* (2006.01)
(Continued)

(52) U.S. Cl.
CPC ............. *F01D 25/18* (2013.01); *F01D 25/16* (2013.01); *F02C 7/06* (2013.01); *F02C 7/36* (2013.01);
(Continued)

(58) Field of Classification Search
CPC .. F01D 25/18; F01D 25/16; F02C 7/06; F02C 7/36; F16H 1/28; F16H 57/0486;
(Continued)

(56) References Cited

U.S. PATENT DOCUMENTS 2,051,886 A 8/1936 Neuland
2,591,743 A 4/1952 Thompson
(Continued)

FOREIGN PATENT DOCUMENTS

JP 60252857 12/1985
JP 61130656 6/1986
JP 62166365 7/1987

OTHER PUBLICATIONS

International Search & Written Opinion for PCT/US2014/050873 dated Dec. 17, 2014.
(Continued)

*Primary Examiner* — David J Hlavka
(74) *Attorney, Agent, or Firm* — Carlson, Gaskey & Olds, P.C.

(57) ABSTRACT

A lubrication system for a fan drive planetary gear system according to an exemplary aspect of the present disclosure includes, among other things, a stationary first bearing configured to receive a lubricant from a lubricant input, the stationary first bearing is axially aligned with a fan drive shaft. A second bearing is configured to rotate with the fan drive shaft, the first bearing engages the second bearing and is configured to transfer the lubricant from the first bearing to the second bearing and into at least one fluid passage in the fan drive shaft. A conduit fluidly connects the at least one passage in the fan drive shaft with at least one component on the fan drive gear system.

20 Claims, 4 Drawing Sheets

Related U.S. Application Data (60) Provisional application No. 61/868,115, filed on Aug. 21, 2013.

(51) Int. Cl.
    *F01D 25/16* (2006.01)
    *F02C 7/36* (2006.01)
    *F02C 7/06* (2006.01)
    *F16H 57/04* (2010.01)

(52) U.S. Cl.
    CPC ............. *F16H 1/28* (2013.01); *F16H 57/043* (2013.01); *F16H 57/0471* (2013.01); *F16H 57/0479* (2013.01); *F16H 57/0486* (2013.01); *F05D 2260/40311* (2013.01); *Y02T 50/671* (2013.01)

(58) Field of Classification Search
    CPC ............. F16H 57/0479; F16H 57/043; F16H 57/0471; F02D 2260/40311
    See application file for complete search history.

(56) References Cited

U.S. PATENT DOCUMENTS

| | | | |
|---|---|---|---|
| 2,684,591 A * | 7/1954 | Lundquist | F16H 1/28 475/158 |
| 2,703,021 A | 3/1955 | Stoeckicht | |
| 2,749,778 A | 6/1956 | Kuhn | |
| 2,830,473 A | 4/1958 | Brown | |
| 2,883,885 A | 4/1959 | Upton | |
| 2,968,922 A | 1/1961 | Gilbert | |
| 3,160,026 A | 12/1964 | Rosen | |
| 3,307,433 A | 3/1967 | Bennett et al. | |
| 3,352,178 A | 11/1967 | Lindgren et al. | |
| 3,459,072 A | 8/1969 | Shannon | |
| 3,650,353 A | 3/1972 | Abbott | |
| 3,754,484 A | 8/1973 | Roberts | |
| 3,776,067 A | 12/1973 | DeBruyne et al. | |
| 3,892,306 A * | 7/1975 | Bertaud | B65G 39/09 198/501 |
| 3,960,029 A | 6/1976 | Eichinger | |
| 4,050,544 A | 9/1977 | Kalyan et al. | |
| 4,227,427 A | 10/1980 | Dick | |
| 4,271,928 A | 6/1981 | Northern | |
| 4,378,711 A | 4/1983 | Daniel | |
| 4,438,663 A | 3/1984 | Eichenberger et al. | |
| 4,455,888 A | 6/1984 | Wayman et al. | |
| 4,467,670 A | 8/1984 | Kawamoto | |
| 4,528,870 A | 7/1985 | Van Deursen et al. | |
| 4,583,413 A | 4/1986 | Lack | |
| 4,657,410 A | 4/1987 | Hibner | |
| 4,784,018 A | 11/1988 | Okada et al. | |
| 4,950,213 A | 8/1990 | Morisawa | |
| 5,058,452 A | 10/1991 | El-Shafei | |
| 5,102,379 A | 4/1992 | Pagluica et al. | |
| 5,433,674 A | 7/1995 | Sheridan et al. | |
| 5,466,198 A | 11/1995 | McKibbin et al. | |
| 5,472,059 A | 12/1995 | Schlosser et al. | |
| 5,472,383 A | 12/1995 | McKibbin | |
| 5,643,126 A | 7/1997 | Hotta et al. | |
| 5,685,797 A | 11/1997 | Barnsby et al. | |
| 5,830,098 A | 11/1998 | Kimes | |
| 6,223,616 B1 | 5/2001 | Sheridan | |
| 7,704,178 B2 | 4/2010 | Sheridan et al. | |
| 8,366,382 B1 | 2/2013 | Muldoon | |
| 8,484,942 B1 | 7/2013 | McCune et al. | |
| 8,944,216 B2 | 2/2015 | Rollins | |
| 2008/0044276 A1 | 2/2008 | McCune et al. | |
| 2009/0090096 A1 | 4/2009 | Sheridan | |
| 2010/0154217 A1 | 6/2010 | Sheridan et al. | |
| 2010/0160105 A1 | 6/2010 | Sheridan et al. | |
| 2012/0088624 A1 * | 4/2012 | Sheridan | F01D 25/16 475/159 |
| 2012/0192570 A1 | 8/2012 | McCune et al. | |
| 2015/0089959 A1 * | 4/2015 | Merry | F01D 25/162 60/805 |
| 2015/0200256 A1 * | 7/2015 | Hanser | C30B 25/02 257/76 |
| 2016/0160714 A1 * | 6/2016 | James | F01D 25/20 60/783 |

OTHER PUBLICATIONS

International Preliminary Report on Patentability for PCT Application No. PCT/US2014/050873, dated Mar. 3, 2016.

European Search Report for European Application No. 14838303.7 dated Feb. 23, 2017.

* cited by examiner

REDUCED MISALIGNMENT GEAR SYSTEM

CROSS-REFERENCE TO RELATED APPLICATIONS

This application is a continuation of U.S. application Ser. No. 14/912,535 filed on Feb. 17, 2016 which is a U.S. National phase of International Application No. PCT/US2014/050873 filed Aug. 13, 2014, which claims priority to Provisional Application No. 61/868,115, filed on Aug. 21, 2013.

BACKGROUND

Planetary gear trains are complex mechanisms that reduce, or occasionally increase, the rotational speed between two rotating shafts or rotors. The compactness of planetary gear trains makes them appealing for use in aircraft engines where space is at a premium.

The forces and torque transferred through a planetary gear train place stresses on the gear train components that may make them susceptible to breakage and wear. In practice, conditions may be less than ideal and place additional stresses on the gear components. For example the longitudinal axes of a planetary gear train's sun gear, planet carrier, and ring gear are ideally coaxial with the longitudinal axis of an external shaft that rotates the sun gear. Such perfect coaxial alignment, however, is rare due to numerous factors including imbalances in rotating hardware, manufacturing imperfections, and transient flexure of shafts and support frames due to aircraft maneuvers. The resulting parallel and angular misalignments impose moments and forces on the gear teeth, the bearings which support the planet gears in their carrier, and the carrier itself. These imposed forces and moments may cause gear component wear and increase a likelihood that a component may break in service. Component breakage is undesirable in any application, but particularly so in an aircraft engine. Moreover, component wear necessitates inspections and part replacements which may render the engine and aircraft uneconomical to operate.

The risk of component breakage may be reduced by making the gear train components larger and therefore stronger. Increased size may also reduce wear by distributing the transmitted forces over correspondingly larger surfaces. However increased size offsets the compactness that makes planetary gear trains appealing for use in aircraft engines, and the corresponding weight increase is similarly undesirable. The use of high strength materials and wear resistant coatings can also be beneficial, but escalates the cost of the gear train and therefore does not diminish the desire to reduce wear.

Stresses due to misalignments can also be reduced by the use of flexible couplings to connect the gear train to external devices such as rotating shafts or non-rotating supports. For example, a flexible coupling connecting a sun gear to a drive shaft flexes so that the sun gear remains near its ideal orientation with respect to the mating planet gears even though the axis of the shaft is oblique or displaced with respect to a perfectly aligned orientation. Many prior art couplings, however, contain multiple parts that require lubrication and are themselves susceptible to wear. Prior art couplings may also lack adequate rigidity and strength, with respect to torsion about a longitudinal axis, to be useful in high torque applications.

SUMMARY

In one exemplary embodiment, a lubrication system for a fan drive planetary gear system includes a stationary first bearing configured to receive a lubricant from a lubricant input. The stationary first bearing is axially aligned with a fan drive output shaft. A second bearing is configured to rotate with the fan drive output shaft. The stationary first bearing engages the second bearing and is configured to transfer the lubricant from the stationary first bearing to the second bearing and into at least one fluid passageway in the fan drive output shaft. A conduit fluidly connects least one passageway in the fan drive output shaft with at least one component on the fan drive gear system.

In a further embodiment of any of the above, an inner first race on the stationary first bearing is configured to transfer lubricant to a first opening in registration with the inner first race in the second bearing.

In a further embodiment of any of the above, the fan drive gear system includes a first axial side and a second axial side. The stationary first bearing, the second bearing, and a fan output drive shaft bearing is located on the first axial side of the fan drive gear system.

In a further embodiment of any of the above, the stationary first bearing and the second bearing are mounted between two fan rotor bearings.

In a further embodiment of any of the above, the stationary first bearing and the second bearing are located radially inward from a radially innermost portion of a fan drive output shaft bearing.

In a further embodiment of any of the above, the fan drive gear system includes a sun gear attached to an input drive shaft configured to rotate at a first rotational speed and an output attached to the fan drive output shaft configured to rotate at a second rotational speed. The first rotational speed being is greater than the second rotational speed. The second bearing is fixedly attached to the fan drive output shaft.

In a further embodiment of any of the above, the fan drive gear system includes a plurality of planet gears mounted on bearings. The bearing includes at least one of a ball bearing, a roller bearing, and a journal bearing.

In a further embodiment of any of the above, the stationary first bearing and the second bearing are disposed about a rotational axis.

In a further embodiment of any of the above, the conduit is parallel to the rotational axis and at least partially radially aligned with a planet gear of the fan drive gear system.

In a further embodiment of any of the above, at least one fluid passageway extends from a radially outer side of the fan drive output shaft to a radially inner side of the fan drive output shaft and the conduit is flexible.

In a further embodiment of any of the above, at least one component of the fan drive gear system includes at least one of a ring gear, a sun gear, a planetary gear, and a bearing.

In a further embodiment of any of the above, the fan drive gear system includes a substantially symmetric carrier.

In another exemplary embodiment, a fan drive planetary gear system for a gas turbine engine includes a fan drive output shaft that includes at least one fluid passageway. A planetary gear system is coupled to the fan drive output shaft. A stationary first bearing is configured to receive a lubricant from a lubricant input. A second bearing is configured to rotate with the fan drive output shaft and receive the lubricant from the first bearing. A conduit is fluidly connecting at least one fluid passageway in the fan drive output shaft to at least one component of the planetary gear system.

In a further embodiment of any of the above, an inner first race on the stationary first bearing is configured to transfer lubricant to a first opening in registration with the inner first race in the second bearing.

In a further embodiment of any of the above, the first bearing and the second bearing are located radially inward from a radially innermost portion of a fan output drive shaft bearing.

In a further embodiment of any of the above, the second bearing is fixedly attached to the fan drive output shaft and at least one fluid passageway extends from a radially outer side of the fan drive output shaft to a radially inner side of the fan drive output shaft.

In a further embodiment of any of the above, the planetary gear system includes a substantially symmetric carrier.

In another exemplary embodiment, a method of lubricating a component on a gas turbine engine includes directing a lubricant through an oil transfer bearing that has a stationary first bearing and a second bearing configured to rotate with a fan drive output shaft. The lubricant is directed from the oil transfer bearing through at least one passageway on the fan drive output shaft. The lubricant is directed through a conduit connecting the at least one passageway on the fan drive output shaft to at least one component on a planetary gear system.

In a further embodiment of any of the above, the method includes flexing the conduit in response to relative movement between the fan drive output shaft and a carrier on the planetary gear system.

In a further embodiment of any of the above, the method includes leaking the lubricant from the oil transfer bearing and directing the lubricant leaked from the oil transfer bearing to at least one bearing system on the fan drive output shaft.

The various features and advantages of this disclosure will become apparent to those skilled in the art from the following detailed description. The drawings that accompany the detailed description can be briefly described as follows.

DETAILED DESCRIPTION

Figure 1:
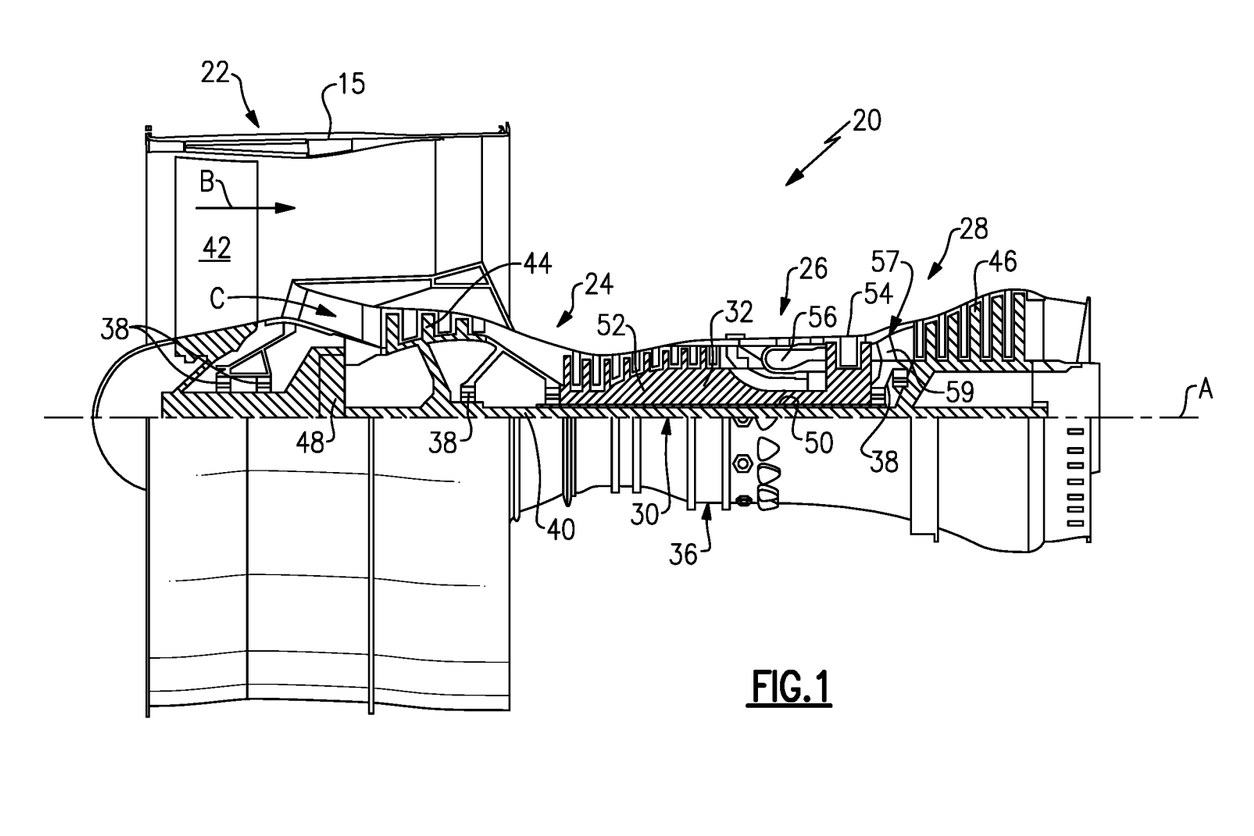
FIG. 1 illustrates a schematic view a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a fan case or fan duct 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine engine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and the geared architecture 48 may be varied. For example, the geared architecture 48 may be located aft of the combustor section 26 or even aft of turbine section 28, and fan section 22 may be positioned forward or aft of the location of the geared architecture 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{R})/(518.7° \text{R})]^{0.5}$. The "Low corrected fan tip speed" as disclosed herein according to one non-limiting embodiment is less than about 1150 ft/second.

Figures 2, 3, 3A, 3B, 3C:
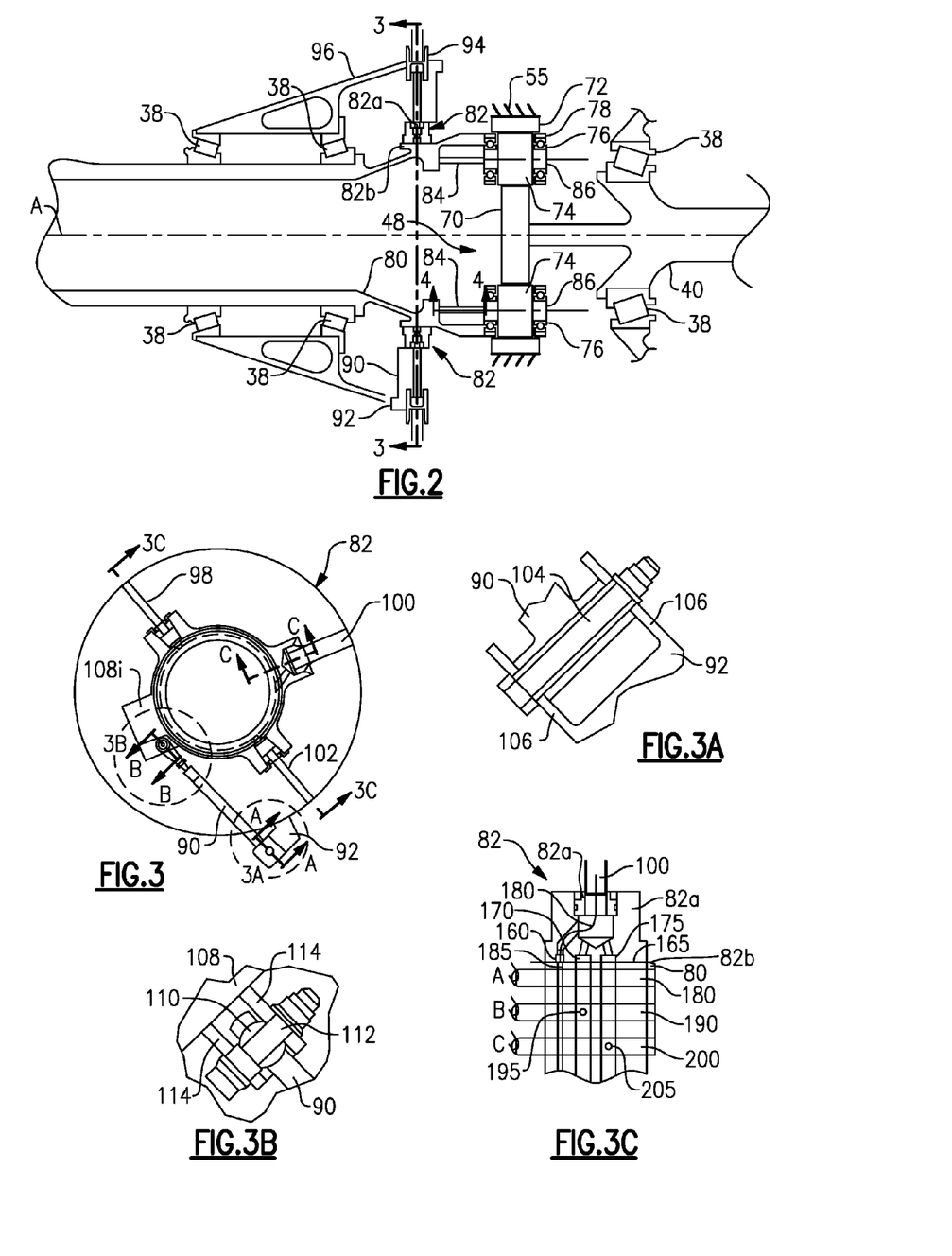
FIG. 2 illustrates a sectional view of the gas turbine engine of FIG. 1.
FIG. 3 illustrates a sectional view taken along the lines 3-3 of FIG. 2.
FIG. 3A illustrates a sectional view taken along the line A-A of FIG. 3.
FIG. 3B illustrates a sectional view taken along the line B-B of FIG. 3.
FIG. 3C illustrates a sectional view taken along the line C-C FIG. 3.

FIG. 2 illustrates an example embodiment of the geared architecture 48 incorporated into the gas turbine engine 20. In this example, the geared architecture 48 includes a planetary gear system having a sun gear 70, a fixed ring gear 72 disposed about the sun gear 70, and planetary gears 74. Each of the planetary gears 74 includes rolling bearings 76, such as ball bearings, roller bearings, or journal bearings. A carrier 78 supports each of the planetary gears 74. In this embodiment, the fixed ring gear 72 does not rotate and is connected to a grounded structure 55 of the gas turbine engine 20. The inner shaft 40 connects the sun gear 70 with the low pressure turbine 46 and the low pressure compressor 44.

A torque frame 80 is coupled to the carrier 78 and drives the fan 42. The carrier 78 and the torque frame 80 are mechanically connected by known means of reducing misalignment between the carrier 78 and the torque frame 80 according to U.S. Pat. No. 5,391,125 to Turra et al. and U.S. Pat. No. 5,466,198 to McKibbin et al., which are incorporated by reference. The following description provides a means to transfer oil between the carrier 78 and the torque frame 80 in a manner that isolates and reduces misalignment to the geared architecture 48 by allowing the carrier 78 to be symmetrical fore and aft for uniform centrifugal growth under operation. Bearing systems 38 support the torque frame 80 and the inner shaft 40. An oil transfer bearing 82 engages the torque frame 80 to deliver lubricant to the geared architecture 48 through conduits 180, 190, and 200 (FIG. 3C) through the torque frame 80 to flexible jumper tubes 84 extending between the torque frame 80 and the geared architecture 48. The oil transfer bearing 82 includes a stationary bearing 82a and a rotating bearing 82b that rotates with the torque frame 80.

Referring to FIG. 3, the stationary oil transfer bearing 82 is prevented from rotational movement by attachment of a link 90 via tab 92 to an oil input coupling 94 that attaches to a bearing support 96 (see FIG. 2).

The oil transfer bearing 82 includes a plurality of inputs to provide lubricant to those portions of the geared architecture 48 that require lubrication during operation. For instance, lubricant from first tube 98 is intended to lubricate the bearing systems 38, oil from second tube 100 is intended to lubricate the bearings 76 (see FIG. 2), and oil from third tube 102 is intended to lubricate the sun gear 70, the planetary gears 74, and the ring gear 72. Though three inputs are shown herein, other numbers of lubricant inputs are contemplated herein.

Referring to FIGS. 3A and 3B, the link 90 attaches via a pin 104 to ears 106 extending from the tab 92. The link 90 extends towards a boss 108 on the oil transfer bearing 82 and is attached thereto by a ball 110 and a pin 112 extending through the ball 110 and a pair of ears 114 on the boss 108 on the oil transfer bearing 82. The ball 110 allows the oil transfer bearing 82 to flex with the torque frame 80 as torquing moments are experienced by the fan 42 and other portions of the engine 20. The link 90 prevents the oil transfer bearing 82 from rotating while allowing it to flex.

FIG. 3C illustrates a cross-sectional view of the oil transfer bearing 82. The oil transfer bearing 82 has a first race 160 that has a rectangular shape and extends around an interior surface 165 of the oil transfer bearing 82, a second race 170 that has a rectangular shape and extends around the interior surface 165 of the oil transfer bearing 82 and a third race 175 that has a rectangular shape and extends around the interior surface 165 of the oil transfer bearing 82. In the embodiment shown, the tube 100 inputs oil via conduit 180 into the first race 160.

The torque frame 80 includes a first oil conduit 180 extending axially therein and communicating with the first race 160 via opening 185, a second oil conduit 190 extending axially therein and communicating with the second race 170 via opening 195 and a third oil conduit 200 extending axially therein and communicating with the third race 175 via opening 205. As the torque frame 80 rotates within the oil transfer bearing 82, the openings 185, 195, 205 are constantly in alignment with races 160, 170, 175 respectively so that oil may flow across a rotating gap between the oil transfer bearing 82 and the torque frame 80 through the openings 185, 195, 205 to the conduits 180, 190, 200 to provide lubrication to the areas necessary in engine 20. As will be discussed herein, oil from the first oil conduit 180 flows through pathway A, oil from the second oil conduit 190 flows through pathway B and oil from the third oil conduit 200 flows through pathway C. Oil travels through the pathways A, B, and C to at least one of the flexible jumper tubes 84 to the geared architecture 48.

Figure 4:
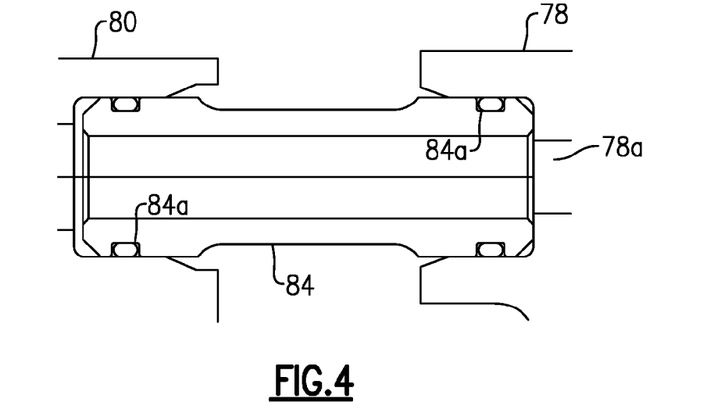
FIG. 4 illustrates a sectional view taken along line 4-4 of FIG. 2.

FIG. 4 illustrates a cross-sectional view taken along line A-A of FIG. 2. The flexible jumper tubes 84 extend between the torque frame 80 and the carrier 78 in this example. The carrier 78 includes at least one fluid pathway 78a that delivers the oil to the necessary parts of the geared architecture 48, such as the planetary gears 74, the ring gear 72, the sun gear 70, and the bearings 76. The flexible jumper tube 84 includes grooves 84a for accepting at least one O-ring 85 to create a seal between the flexible jumper tube 84 and the torque frame 80 on one end and the carrier 78 on another opposite end. The flexible jumper tube 84 allows for flexing or relative movement between the torque frame 80 and the carrier 78 during operation while preventing oil leaks.

Figure 5:
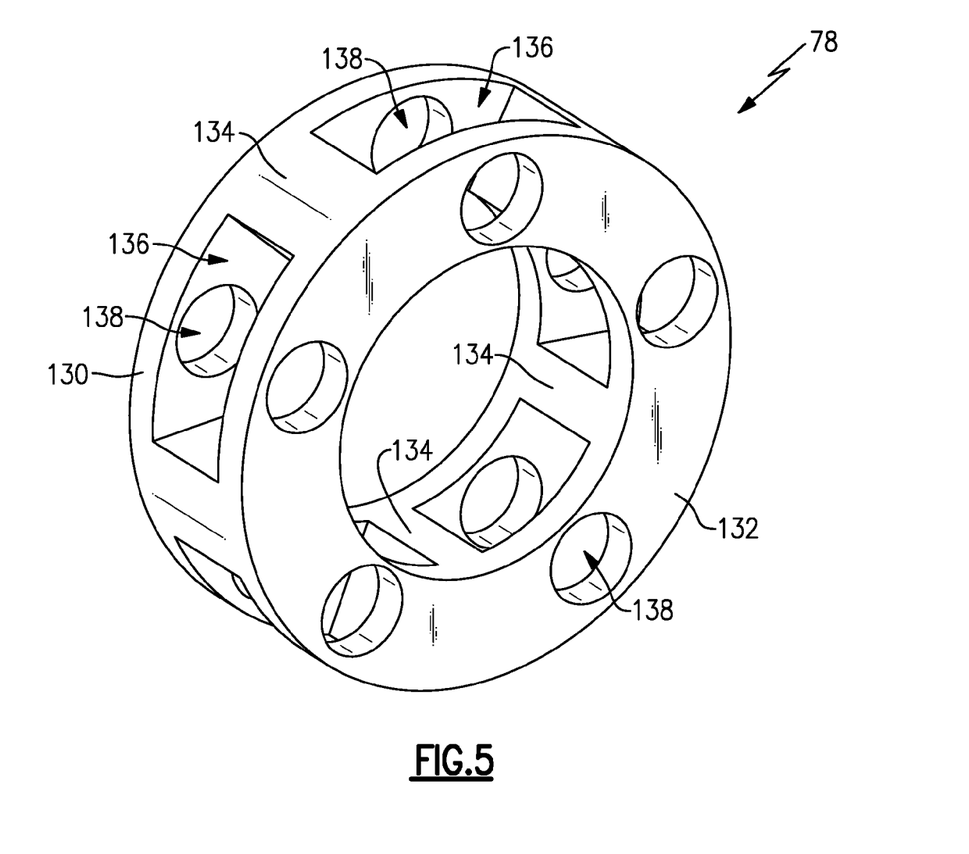
FIG. 5 illustrates an example carrier.

FIG. 5 illustrates the example carrier 78. The carrier 78 includes a first plate 130 that is symmetrical to a second plate 132. The symmetrical first and second plates 130 and 132 allow the carrier 78 to grow uniformly in a radial direction during use. By having uniform growth in the radial direction, misalignment between the carrier 78 and the planetary gears 74, the sun gear 70, and the ring gear 72 is reduced. Reduced misalignment reduces the amount of wear on the geared architecture 48 and extends its life. Additionally, uniform growth reduces weight because additional support structures will not be required to maintain proper alignment of the geared architecture 48. The symmetrical first and second plates 130 and 132 are spaced from each other with spacers 134. The first and second plates 130 and 132 form pockets 136 with the adjacent spacers 134 to accept one of the planetary gears 74. Shaft openings 138 extending through the first and second plates 130 and 132 into the pockets 136 accept a shaft 86 and the bearings 76 for each of the planetary gears 74.

Figure 6:
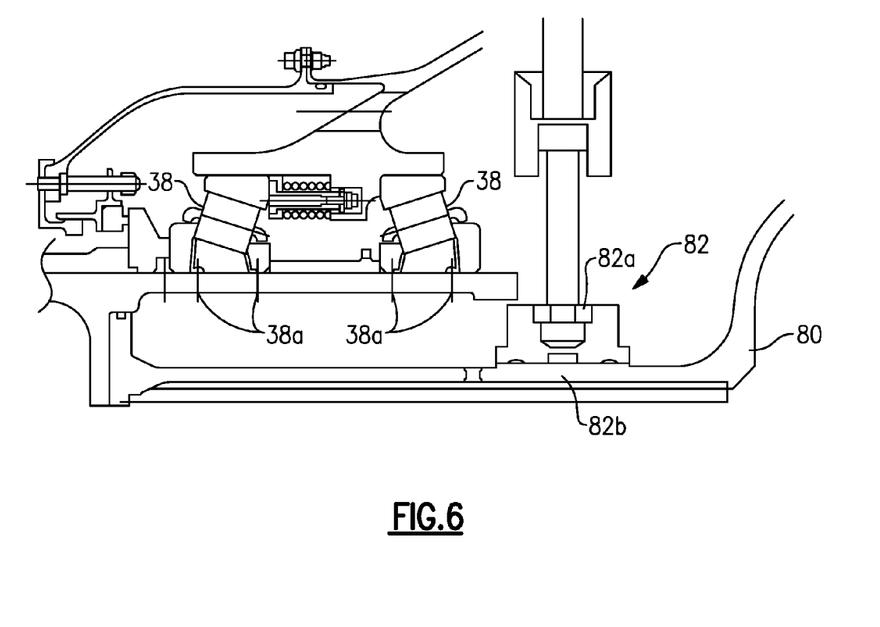
FIG. 6 illustrates an example oil transfer bearing.

FIG. 6 illustrates the oil transfer bearing 82 located radially inward from the bearing systems 38 on the torque frame 80. Bearing systems conduits 38*a* extend through the torque frame 80 to direct lubricant leaking from the oil transfer bearing 82 into the bearing systems 38 on the torque frame shaft. Once the lubricant has leaked from the oil transfer bearing 82, centrifugal forces from the rotation of the torque frame 80 direct the lubricant toward the bearing system conduits 38*a* and to the bearing systems 38. Therefore, oil that would otherwise require collection from the oil transfer bearing 82 can be utilized in other areas of the gas turbine engine 20.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A lubrication system for a fan drive planetary gear system comprising:
   a stationary first bearing in fluid communication with a lubricant input, the stationary first bearing is axially aligned with a fan drive output shaft;
   a second bearing rotating with the fan drive output shaft, the stationary first bearing engages the second bearing and transfers the lubricant from the stationary first bearing to the second bearing and into at least one fluid passageway in the fan drive output shaft; and
   a conduit fluidly connecting the at least one passageway in the fan drive output shaft with at least one component on the fan drive gear system.

2. The lubrication system of claim 1, including an inner first race on the stationary first bearing transferring lubricant to a first opening in registration with the inner first race in the second bearing.

3. The lubrication system of claim 2, wherein the fan drive gear system includes a first axial side and a second axial side, the stationary first bearing, the second bearing, and a fan output drive shaft bearing is located on the first axial side of the fan drive gear system.

4. The lubrication system of claim 3, wherein the stationary first bearing and the second bearing are mounted between the fan output drive shaft bearing and the fan drive gear system.

5. The lubrication system of claim 3, wherein the stationary first bearing and the second bearing are located radially inward from a radially innermost portion of the fan output drive shaft bearing.

6. The lubrication system of claim 5, wherein the fan drive gear system includes a sun gear attached to an input drive shaft rotating at a first rotational speed and an output attached to the fan drive output shaft rotating at a second rotational speed, the first rotational speed being greater than the second rotational speed, and the second bearing is fixedly attached to the fan drive output shaft.

7. The lubrication system of claim 6, wherein the fan drive gear system includes a plurality of planet gears mounted on bearings and the bearing includes at least one of a ball bearing, a roller bearing, and a journal bearing.

8. The lubrication system of claim 7, wherein the stationary first bearing and the second bearing are disposed about a rotational axis.

9. The lubrication system of claim 8, wherein the conduit is parallel to the rotational axis and at least partially radially aligned with at least one planet gear of the plurality of planet gears of the fan drive gear system.

10. The lubrication system of claim 2, wherein the at least one fluid passageway extends from a radially outer side of the fan drive output shaft to a radially inner side of the fan drive output shaft and the conduit is flexible.

11. The lubrication system of claim 2, wherein the at least one component of the fan drive gear system includes at least one of a ring gear, a sun gear, a planetary gear, and a bearing.

12. The lubrication system of claim 11, wherein the fan drive gear system includes a substantially symmetric carrier.

13. A fan drive planetary gear system for a gas turbine engine comprising:
    a fan drive output shaft including at least one fluid passageway;
    a planetary gear system coupled to the fan drive output shaft;
    a stationary first bearing in fluid communication with a lubricant from a lubricant input;
    a second bearing rotating with the fan drive output shaft and receive the lubricant from the first bearing; and
    a conduit fluidly connecting the at least one fluid passageway in the fan drive output shaft to at least one component of the planetary gear system.

14. The system of claim 13, including an inner first race on the stationary first bearing transferring lubricant to a first opening in registration with the inner first race in the second bearing.

15. The system of claim 14, wherein the first bearing and the second bearing are located radially inward from a radially innermost portion of a fan output drive shaft bearing.

16. The system of claim 15, wherein the second bearing is fixedly attached to the fan drive output shaft and the at least one fluid passageway extends from a radially outer side of the fan drive output shaft to a radially inner side of the fan drive output shaft.

17. The system of claim 16, wherein the planetary gear system includes a substantially symmetric carrier.

18. A method of lubricating a component on a gas turbine engine comprising:
    directing a lubricant through an oil transfer bearing having a stationary first bearing and a second bearing rotating with a fan drive output shaft;
    directing the lubricant from the oil transfer bearing through at least one passageway on the fan drive output shaft;
    directing the lubricant through a conduit connecting the at least one passageway on the fan drive output shaft to at least one component on a planetary gear system.

19. The method of claim 18, including flexing the conduit in response to relative movement between the fan drive output shaft and a carrier on the planetary gear system, wherein the at least one passageway extends from a radially outer side of the fan drive output shaft to a radially inner side of the fan drive output shaft and the conduit is flexible.

20. The method of claim 19, including leaking the lubricant from the oil transfer bearing and directing the lubricant leaked from the oil transfer bearing to at least one bearing system on the fan drive output shaft.

* * * * *